(12) United States Patent
Truffaut et al.

(10) Patent No.: US 6,352,325 B1
(45) Date of Patent: Mar. 5, 2002

(54) DEVICE FOR DETERMINING A QUANTITY OF CONSUMABLE PRODUCT CONTAINED IN AT LEAST ONE RESERVOIR AND A DOCUMENT PRINTING DEVICE EQUIPPED WITH SUCH AN IMPROVEMENT

(75) Inventors: Christophe Truffaut, Rennes; Marie-Hélène Froger, Chateaugiron; Pascal Coudray, Melesse; Mickaël Lorgeoux, Rennes, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/315,017

(22) Filed: May 20, 1999

(30) Foreign Application Priority Data

May 27, 1998 (FR) .............................. 98 06674
May 27, 1998 (FR) .............................. 98 06673

(51) Int. Cl.⁷ .............................. B41J 2/195
(52) U.S. Cl. .............................. 347/7; 347/37; 347/50
(58) Field of Search .............................. 347/7, 37, 86, 347/87, 50; 73/304 C

(56) References Cited

U.S. PATENT DOCUMENTS

| | | | |
|---|---|---|---|
| 5,255,019 A | * 10/1993 | Mochizuki et al. | ............ 347/7 |
| 5,461,482 A | * 10/1995 | Wilson et al. | ................. 347/50 |
| 5,467,116 A | * 11/1995 | Nakamura et al. | ............. 347/50 |
| 5,682,184 A | 10/1997 | Stephany et al. | ............... 347/7 |
| 6,106,088 A | * 8/2000 | Wafler | ........................... 347/7 |

FOREIGN PATENT DOCUMENTS

| | | |
|---|---|---|
| EP | 47478 | 3/1982 |
| EP | 574182 | 12/1993 |
| EP | 610041 | 8/1994 |
| EP | 703084 | 3/1996 |
| EP | 779156 | 6/1997 |
| JP | 62-156964 | 7/1987 |

OTHER PUBLICATIONS

"Capacitive Ink Level Detector", IBM Technical Disclosure Bulletin, Mar. 1974, 3 pages.

* cited by examiner

Primary Examiner—Craig A. Hallacher
(74) Attorney, Agent, or Firm—Fitzpatrick, Cella, Harper & Scinto

(57) ABSTRACT

According to the invention, electrical connection members are provided, arranged between the chassis and the carriage carrying capacitor plates corresponding respectively to the reservoirs, in order to put into service each plate corresponding to a reservoir, at a predetermined position of the carriage, a common contact element of these connection members being connected to an oscillator.

39 Claims, 9 Drawing Sheets

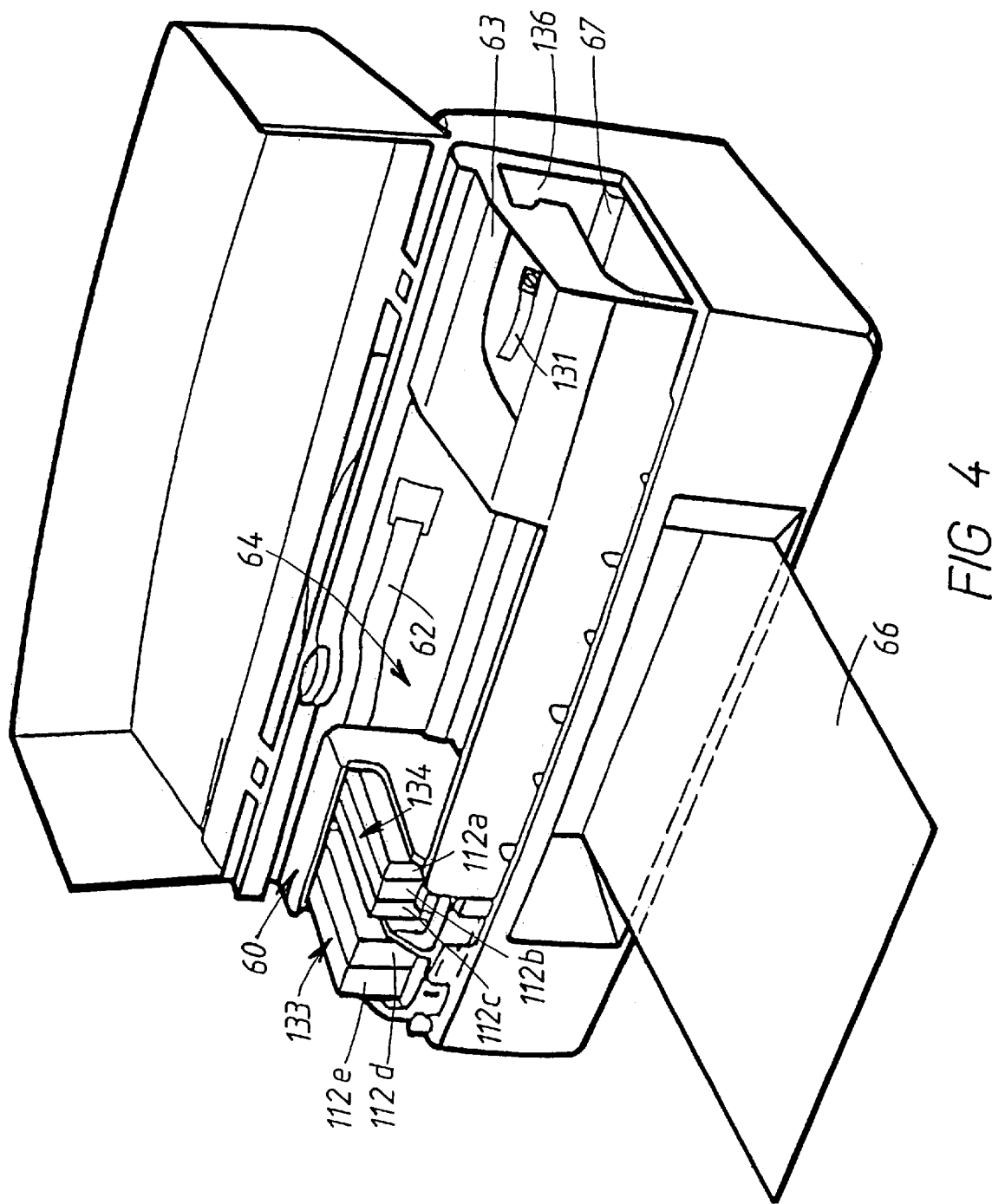

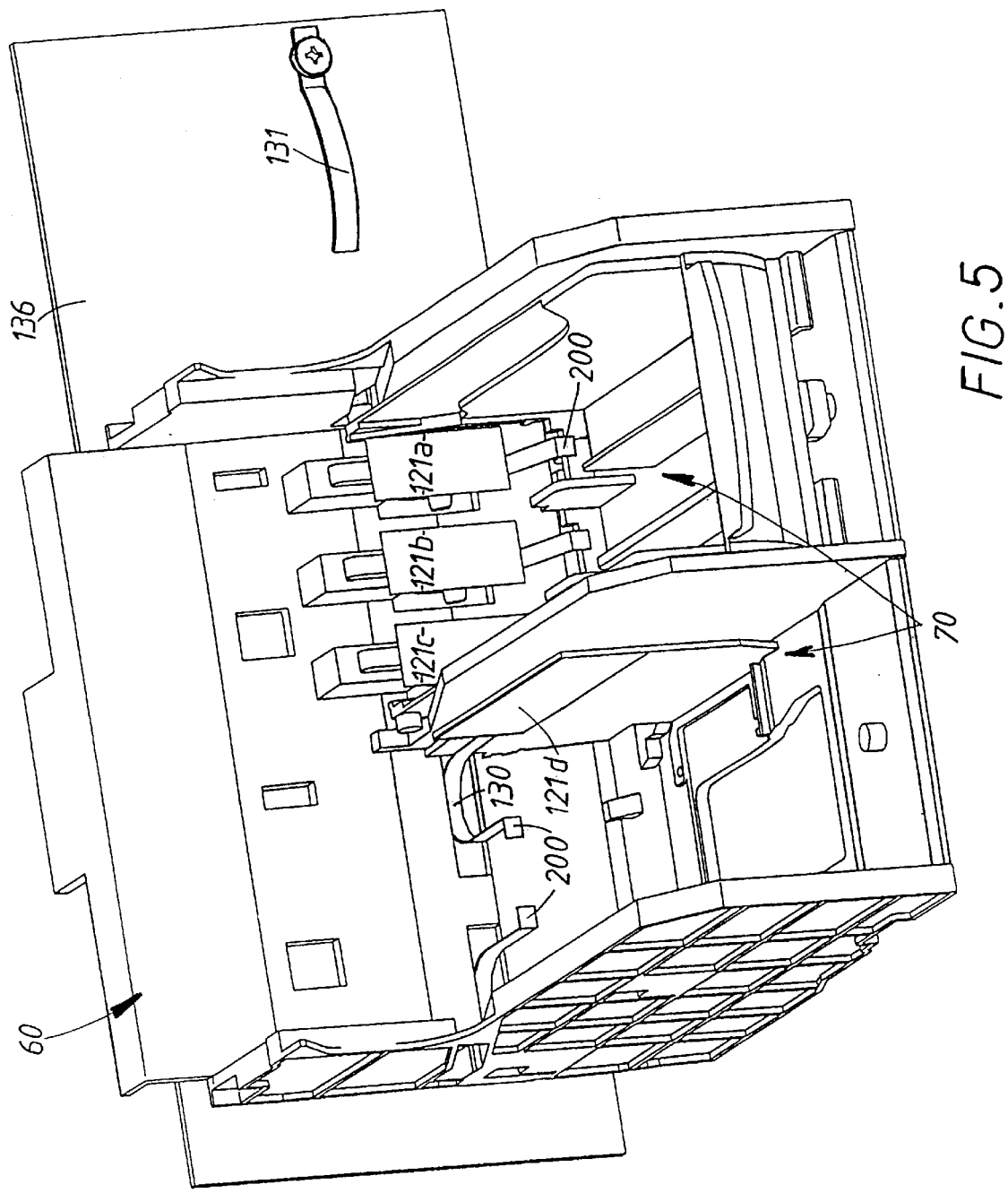

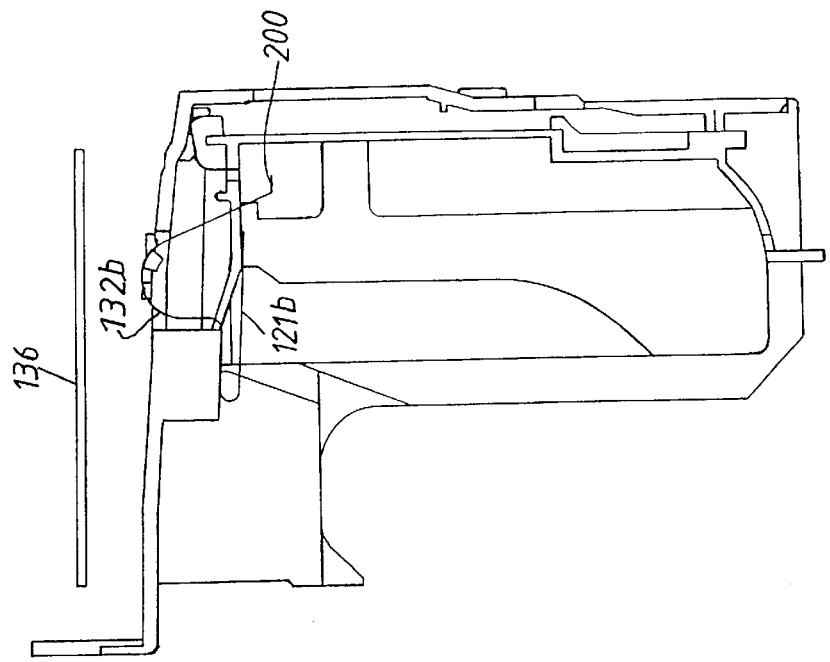
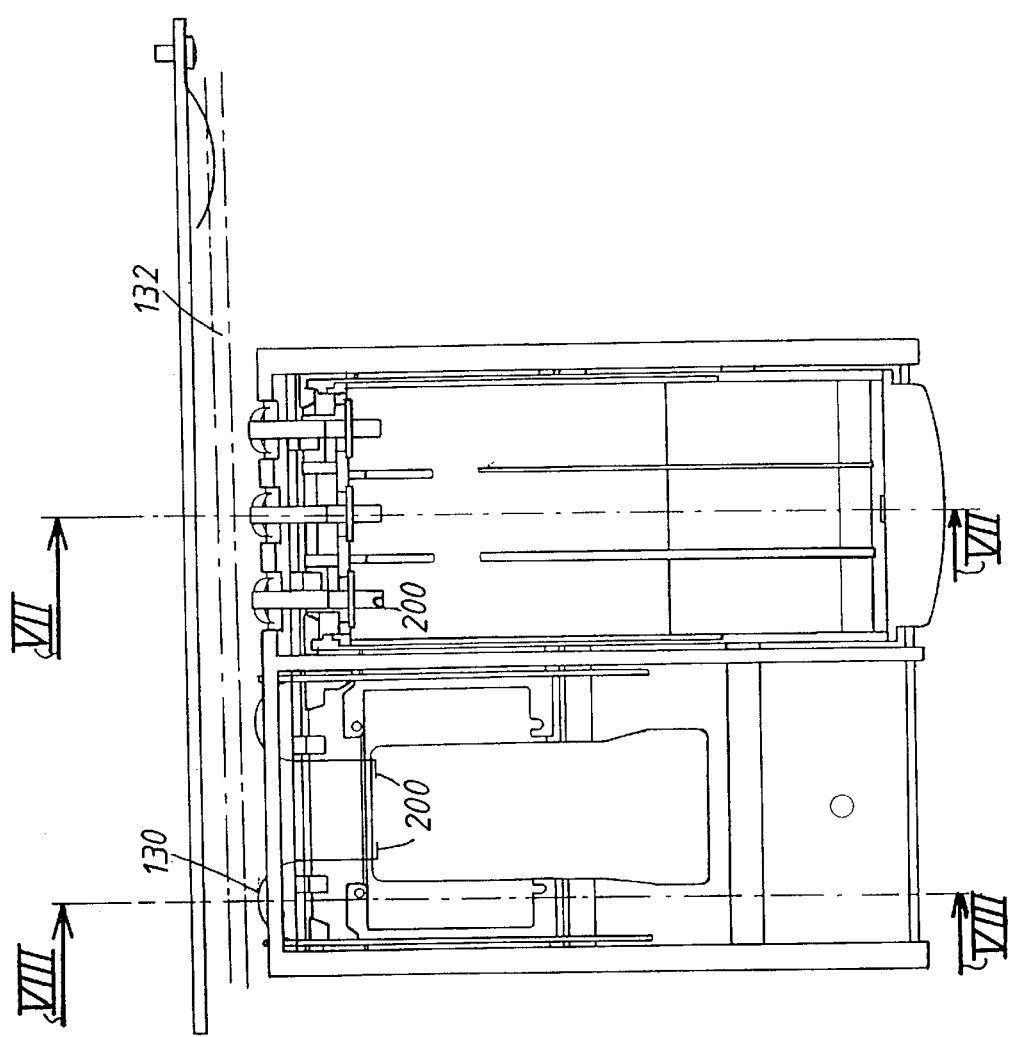
FIG. 7
FIG. 6

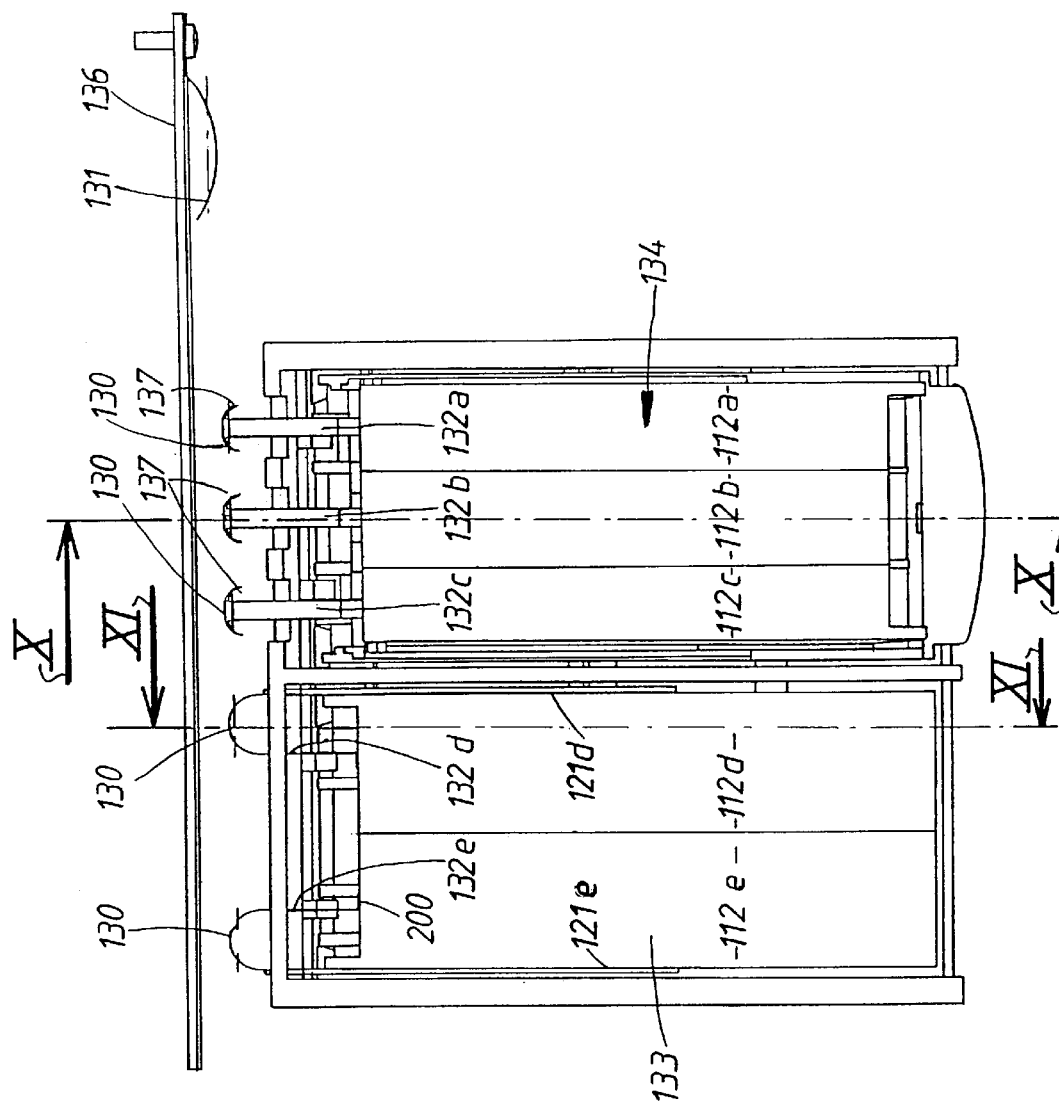
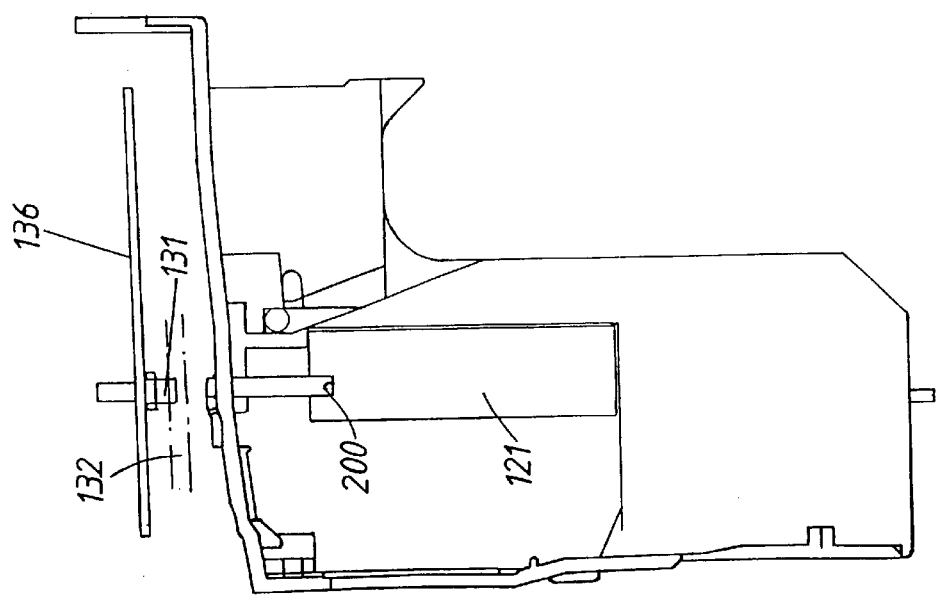
FIG. 9
FIG. 8

DEVICE FOR DETERMINING A QUANTITY OF CONSUMABLE PRODUCT CONTAINED IN AT LEAST ONE RESERVOIR AND A DOCUMENT PRINTING DEVICE EQUIPPED WITH SUCH AN IMPROVEMENT

BACKGROUND OF THE INVENTION

The invention relates to a device for determining a quantity of consumable product contained in at least one reservoir, of the type comprising a capacitive arrangement having a conductive plate associated with such a reservoir, for instance having such a plate normally pressed against a wall of such a reservoir, in order to produce a signal representing the quantity of product contained in the said reservoir.

The invention also concerns an improvement facilitating the fitting of the reservoir in spite of the presence of such a conductive plate, whilst increasing the useful surface of the latter (and consequently the capacitance of the capacitor thus formed), all other things being equal.

The invention also concerns a document printing device having a chassis and a carriage compelled to move along guidance means on this chassis and in which the said carriage carries at least one removable printing product reservoir and a conductive plate able to constitute a capacitor in association with the reservoir in question, the printing device having means of determining the quantity of printing product contained in the reservoir, provided with the improvement mentioned above.

A conventional printing device has one or more reservoirs and a corresponding number of print heads, mounted on a carriage compelled to move along guidance means arranged on a chassis. The printer is completed by a mechanism for moving a printing medium (the sheet of paper), also arranged on the chassis. The said printing medium is moved perpendicularly to the path of the carriage. The latter has a support on which the reservoir or reservoirs are mounted, these being removable individually or in a group or groups. Thus, on an improved printer, there may be up to five reservoirs. Three reservoirs are filled with printing products for the three primary colours: cyan, magenta and yellow, a fourth reservoir is filled with black printing product and a fifth can be provided for containing a colourless product sprayed onto the paper in order to optimise the conditions of application of the pigmented products.

Several reservoirs can be grouped together in a cartridge, for example grouping together the three primary colours, or on the other hand be independent of each other in order to be able to be changed individually. Each reservoir or group of reservoirs is therefore removably mounted on the carriage support. The corresponding print head or heads can be integral with the reservoir or reservoirs (in which case they are changed at the same time as the reservoir or cartridge). In other cases, the print head or heads are mounted permanently on the carriage.

Several ways are known for detecting a printing product level in a reservoir of such a printing device. Notably, it is known that there can be associated with the reservoir a capacitive arrangement placed in a resonant circuit to which an excitation signal is applied, generally a high-frequency alternating signal. The signal transmitted by such a capacitive arrangement varies according to the quantity of ink remaining in the reservoir. This variation can therefore be used for indicating to the user the degree to which the reservoir is filled or at least the fact that a minimum level has been reached. According to the information collected, the user can replace the reservoir or change a cartridge containing this reservoir. Where the carriage carries several reservoirs, the capacitive arrangement designated above comprises several capacitors each surrounding one of the reservoirs.

The document EP 0 028 399 describes a system of this type in which the capacitor is formed by two metal plates between which the ink reservoir is situated. A resonant oscillating circuit is calibrated so that its resonant frequency is reached when the ink level has dropped to a predetermined value.

Several solutions have also been experimented with in order to connect the elements of the device which are on the carriage to those which are on the fixed chassis. For example, a resonant circuit can be mounted on the carriage, the capacitor of this circuit including the reservoir. One resonant circuit per reservoir can be established and an analogue switch can be used for successively making the measurements corresponding to the different reservoirs. Such a system is relatively expensive if it is necessary to provide one resonant circuit per reservoir. The use of an analogue switch also creates stray capacitances which substantially interfere with the measurements.

If the resonant circuit is placed on the chassis, the signals must then be conveyed by flexible cables connecting the carriage and the chassis. These cables create problems of electromagnetic compatibility due to the conveyance of high-frequency signals, and stray capacitances and inductances are also created between the cables, which also interfere with the measurements.

Moreover, if the measurement circuits are placed on the carriage, the latter can be the origin of electrostatic discharges.

Furthermore, in such a system, it is clear that the reservoir or reservoirs must be mounted removably on the carriage and that at least one conductive plate, forming part of the aforementioned capacitive arrangement, must also be carried by the carriage. Since it is a case of measuring a level of liquid product contained in the reservoir, the said plate must be pressed against a normally vertical face of the reservoir. Thus, considering FIGS. 1 and 2, which illustrate the state of the art, FIG. 1 depicts a reservoir A on the point of being mounted on a support B on the carriage. FIG. 2 shows the reservoir installed on this support. A comparison of the two figures shows that it is necessary to incline the reservoir in order to fit it (FIG. 1), which makes it necessary to provide an end wall with an inclined part D. In the end, only the lower part of the corresponding face of the reservoir is in contact with the lower part of the said end wall C. However, it is advantageous, for various technical reasons which will emerge later, to arrange the said conductive plate against the end face E of the reservoir. It will be understood under these circumstances that the surface of the conductive plate would be limited in order to concern, from the electrical point of view, only the lower part of the reservoir in order not to interfere with the fitting of the latter. The capacitance of the capacitor which would be available for making the measurement would be relatively limited.

SUMMARY OF THE INVENTION

The invention makes it possible to overcome all these drawbacks.

One important idea of the invention consists of arranging electrical connection means between the chassis and the carriage in order to electrically bring into service a capacitor plate associated with a reservoir when the said carriage occupies a predetermined position. If the carriage carries several reservoirs, several corresponding predetermined positions are thus defined, for which the level measurements can be made individually and successively for the different reservoirs.

More precisely, the invention concerns a device for determining a quantity of consumable product contained in at least one reservoir, of the type comprising the following components: a capacitive arrangement including a conductive plate associated with the said reservoir, excitation signal production means able to be connected to the said capacitive arrangement, and detection and measurement means for detecting and processing a resulting signal transmitted by the said capacitive arrangement and representing a quantity of product contained in the said reservoir, characterised in that, some of the components mentioned above being mounted on a chassis and others being fixed to a movable carriage moving along a guidance means on the said chassis, electrical connection means are arranged between the said chassis and the said carriage in order to electrically bring into service the said plate corresponding to the said reservoir, for a predetermined position of the said carriage.

Preferably, the capacitive arrangement is associated with an inductor and a resistor, in order to form a resonant circuit.

Where several reservoirs are used, the invention also concerns a device as defined above characterised in that it has several reservoirs grouped side by side, in that the said capacitive arrangement includes several conductive plates associated respectively with the said reservoirs and in that the said connection means form an electrical selector for electrically selecting and bringing into service the aforementioned plates corresponding respectively to the said reservoirs, for predetermined positions of the said carriage.

According to a preferred embodiment, the connection means forming an electrical selector comprise on the one hand a common contact element connected to the said excitation signal production means and on the other hand a plurality of contact elements respectively connected to conductive plates associated with the said reservoirs.

According to another improvement, the electrical connection means are designed so as to make it possible to detect the absence of one or more reservoirs on the carriage. In this case, each contact element of the plurality of contact elements mentioned above has an elastically flexible blade forming a loop. One end of this loop enters, in the unstressed state of the said blade, a recess reserved for the corresponding reservoir and is out of contact with the said common contact element in any position of the said carriage. On the other hand, when the said reservoir is placed in its recess, pushing the said end, the stressed loop is deformed, so that part of it can come into contact with the aforementioned common contact element, for a corresponding predetermined position of the said carriage.

The invention also concerns a document printing device having a chassis, a carriage compelled to move along guidance means arranged on the said chassis and a mechanism for moving a printing medium arranged on the said chassis, in which the said carriage carries at least one printing product reservoir and a print head connected to the said reservoir, the latter being removable and mounted on a corresponding support on the said carriage, of the type also having means of determining the quantity of ink contained in the said reservoir, comprising the following components: a capacitive arrangement including at least one conductive plate associated with the said reservoir, means of producing an excitation signal, able to be connected to the said capacitive arrangement, and detection and measurement means for detecting and processing a resulting signal transmitted by the said capacitive arrangement and representing a quantity of printing product contained in the said reservoir, characterised in that, some of the components mentioned being mounted on the said chassis and others being mounted on the said carriage, electrical connection means are arranged between the said chassis and the said carriage in order to electrically put into service the said plate corresponding to the said reservoir, for a predetermined position of the said carriage.

Where the printing device has several reservoirs, these are grouped together side by side on the support on the said carriage, and the said capacitive arrangement includes several conductive plates associated respectively with the said reservoirs. The said connection means form an electrical selector for electrically selecting and putting into service the aforementioned plates corresponding respectively to the said reservoirs, for predetermined positions of the said carriage.

The invention also proposes an arrangement which affords an easy fitting of the reservoir, good contact between the conductive plate and the face of the reservoir against which it is to be applied, and an increased surface area of this plate, all other things being equal.

To this end, the invention concerns a device for determining the quantity of consumable product contained in at least one removable reservoir able to be mounted on a support, of the type comprising the following components: a capacitive arrangement including at least one conductive plate associated with the said reservoir, means of producing an excitation signal which are able to be connected to the said capacitive arrangement, and detection and measurement means for detecting and processing a resulting signal transmitted by the said capacitive arrangement and representing a quantity of product contained in a corresponding reservoir, some of the said components being mounted on a chassis and others being mounted on a movable carriage moving along a guidance means on the said chassis, characterised in that the said support has a movable block carrying the said plate, in that this block, in the absence of any force, occupies a leaving-clear position facilitating the insertion of the said reservoir and in that it is arranged to be moved by the fitting of the said reservoir and to be maintained in another position when the reservoir is mounted on the said support, the said plate being applied against a face of the said reservoir when the said block is maintained in this other position.

The device defined above can also be characterised in that the said movable block carries an elastic electrical contact element, electrically connected to the said plate and able to occupy two positions, a service position when the said reservoir is in contact with the said movable block and an idle position when the said reservoir is not mounted on its support, the said contact element being able, when it is in the said service position, to cooperate with another electrical contact element for at least one predetermined position of the said carriage in order to establish an electrical connection between the aforementioned two parts of the said components.

Where the support is arranged to carry several reservoirs at predetermined locations, an aforementioned movable block carrying a plate is arranged at each of its locations in order for it to be able to cooperate with the corresponding reservoir.

In this case, the device is also characterised in that the said contact elements associated respectively with the reservoirs are similar and offset along one side of the said carriage parallel to its direction of movement, and in that the said other contact element (or common contact element) is mounted at a fixed location on the said chassis and is capable of cooperating with each of the contact elements for respective predetermined positions of the said carriage, the said contact elements defining selection means forming an electrical selector, arranged between the said chassis and the said carriage in order to electrically select and put into service the aforementioned plates corresponding respectively to the said reservoirs, for the said predetermined positions of the said carriage.

This arrangement also makes it possible to detect the absence of a reservoir on the carriage. This is because each contact element associated with a plate can have an elastically flexible blade, for example metallic, attached to an aforementioned movable block. When a reservoir is placed on the support and the corresponding movable block is in contact therewith, part of this blade is placed so that it can come into contact with the said other contact element for a corresponding predetermined position of the said carriage. On the other hand, the said blade is out of contact with the said other contact element or common contact element, for any position of the carriage when the corresponding reservoir is not placed on the support.

In a particularly simple embodiment, the movable block or blocks are mounted so as to be hinged and tend to tilt freely towards a position placing the contact element in the aforementioned idle position.

The invention also concerns a document printing device having a chassis, a mechanism for moving the printing medium arranged on this chassis, and a carriage compelled to move along guidance means arranged on the said chassis, the said carriage carrying at least one print head and a support for at least one removable printing product reservoir, of the type also having means of determining the quantity of ink contained in the said reservoir, comprising the following components a capacitive arrangement including at least one conductive plate associated with the said reservoir, means of producing an excitation signal which are able to be connected to the said capacitive arrangement, and detection and measurement means for detecting and processing a resulting signal transmitted by the said capacitive arrangement and representing a quantity of printing product contained in the said reservoir, some of the said components being mounted on the said chassis and others being mounted on the said carriage, characterised in that the said support has a movable block carrying the said plate, in that this block, in the absence of any force, occupies a leaving-clear position facilitating the insertion of the said reservoir and in that it is arranged to be moved by the fitting of the said reservoir and to be maintained in another position when the reservoir is mounted on the said support, the said plate being applied against a face of the said reservoir when the said block is maintained in this other position.

The capacitive arrangement can form part of a resonant circuit.

BRIEF DESCRIPTION OF THE DRAWINGS

The invention will be understood better and other advantages thereof will emerge more clearly in the light of the following description of a document printing device implementing its principle, given solely by way of example and made with reference to the accompanying drawings in which:

FIG. 4 is a perspective view with partial cutaway illustrating such a printing device;

FIG. 5 is a partial view in perspective illustrating schematically the carriage of the printing device, the printing product reservoirs being removed from the carriage;

FIG. 6 is a plan view of FIG. 5;

FIG. 7 is a section VII—VII in FIG. 6

FIG. 8 is a section VIII—VIII in FIG. 6;

FIG. 9 is a view similar to FIG. 6, the reservoirs or reservoir cartridges being mounted on the carriage;

DESCRIPTION OF PREFERRED EMBODIMENTS

Figure 1:
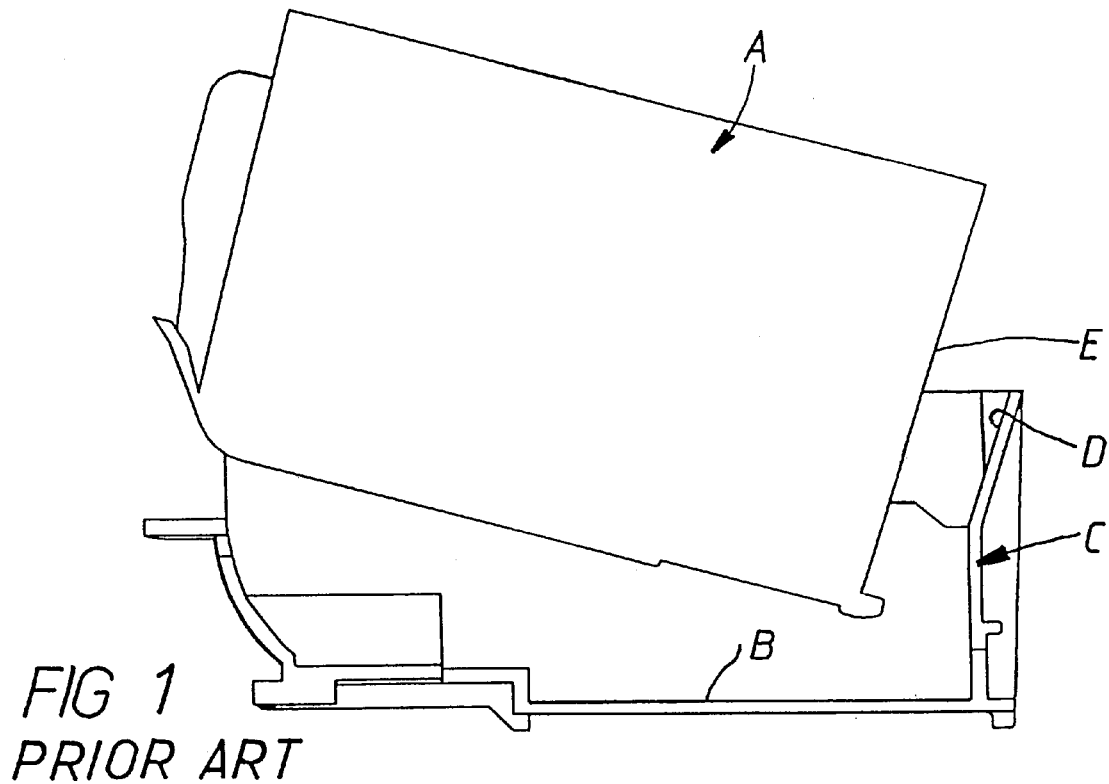
FIGS. 1 and 2 illustrate schematically the fitting of a reservoir on a carriage, in accordance with the state of the art.
Figure 2:
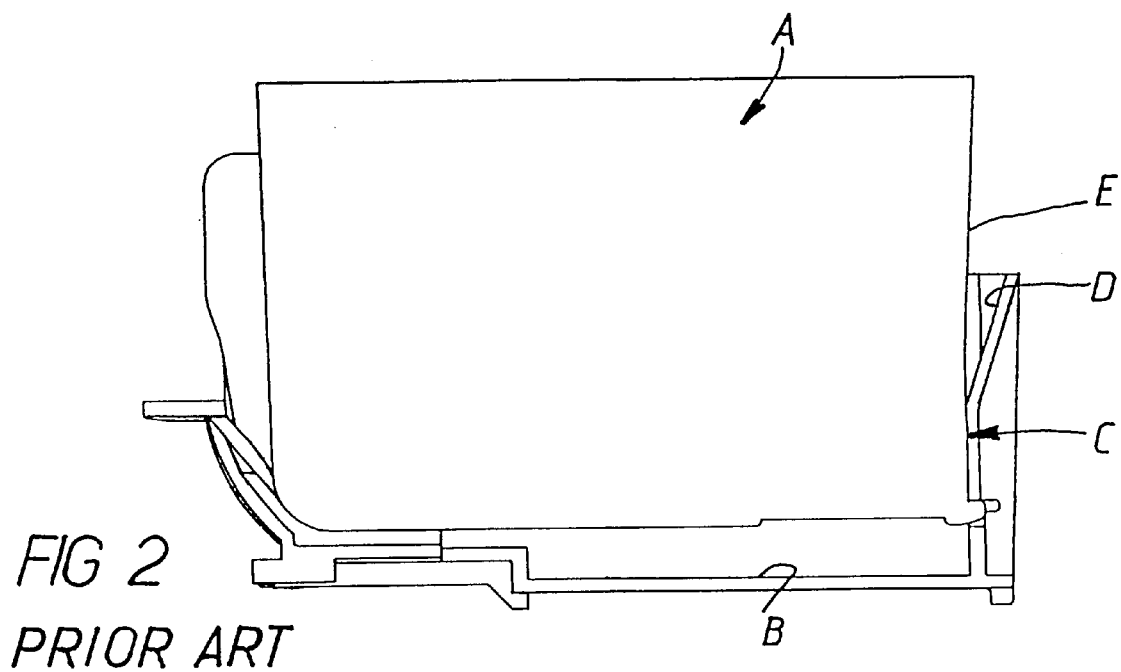
Figure 3:
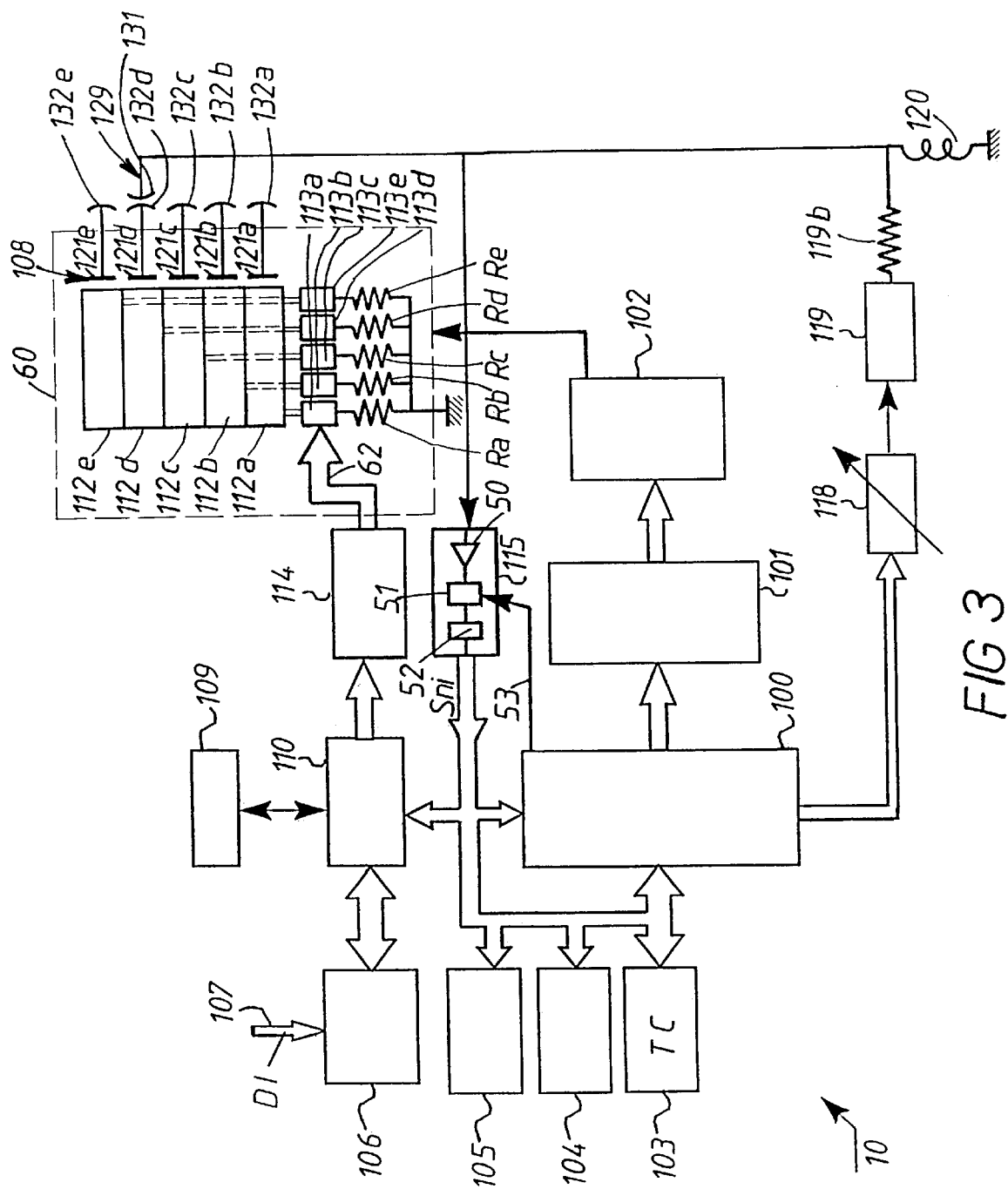
FIG. 3 is a block diagram of the printing device.
Figure 11:
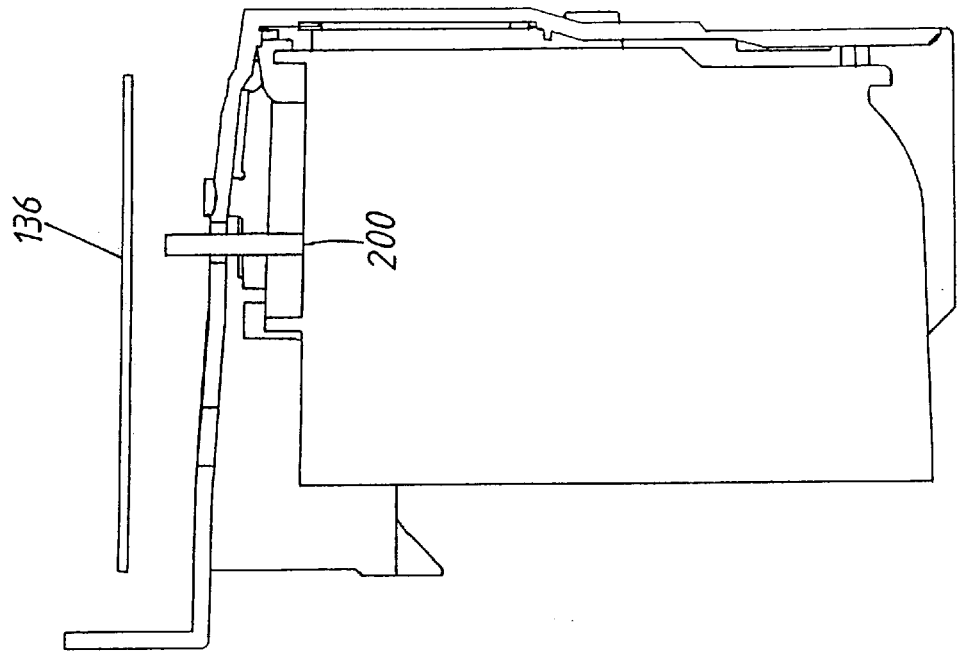
FIG. 11 is a section XI—XI in FIG. 9.
Figure 10:
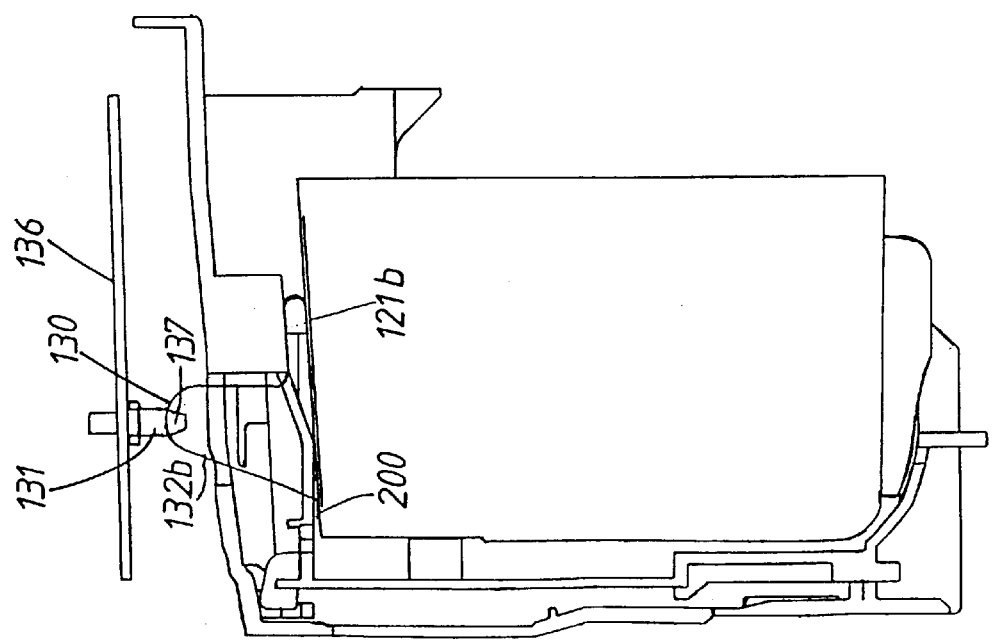
FIG. 10 is a section X—X in FIG. 9.

Referring more particularly to FIG. 3 et seq, a document printing device is depicted, constituting here a colour printer 10 which receives data to be printed DI, representing a text or an image, by means of a parallel input/output port 107. The latter is connected to an interface circuit 106 itself connected to a circuit controlling the ejection of printing products 110, which controls print heads 113a, 113b, 113c, 113d, 113e, via an amplification circuit 114 with five channels. Each print head is connected to a reservoir of ink or similar pigmented printing product, affording colour printing. The three reservoirs 112a, 112b and 112c contain respectively printing products of different colours, respectively the three primary colours, which are magenta (a), cyan (b) and yellow (c). These three reservoirs are grouped together side by side on the right-hand part of a carriage as seen in FIG. 4. They can even constitute a single exchangeable cartridge 134. The reservoir 112d contains a black printing product and the reservoir 112e contains a colourless product intended to facilitate printing, as indicated above. The two reservoirs 112d and 112e are disposed side by side on the left-hand part of the carriage as seen in FIG. 4. They can also be combined in a single cartridge 133.

As shown in FIG. 3, each reservoir communicates with a print head carried by the carriage. The print heads are not visible in FIG. 4; they are located underneath the carriage. From the electrical point of view, each print head has an impedance with respect to earth, represented by a resistance Ra to Re. The carriage 60 is compelled to move along guidance means 67 arranged on the chassis 64 of the appliance. These guidance means, formed by parallel rods and rails, are conventional. The carriage 60 is moved in a reciprocating motion along these guidance means. It is driven by a motor 102, through a conventional mechanism. The movement path of the carriage and consequently of the print heads 113a–113e is parallel to a line to be printed on a printing medium 66 such as a sheet of paper. This printing medium is moved perpendicularly to the path of the carriage by the printer mechanism, known per se. Outside the printing periods, the carriage is immobilised on one side of the active printing area at a location protected by a housing 63 fixed to the chassis 64.

Thus the different reservoirs (or cartridges) are removably mounted on a support 70 on the carriage. When the reservoirs are in place, they are automatically connected to the corresponding print heads. As can be seen in FIG. 5, ribs and partitions are provided on the carriage for the correct containment and positioning of the reservoirs and/or cartridges.

The printing device also has a main data processing circuit 100 associated with a read only memory 103 and a random access memory 109. The read only memory 103 contains the operating programs of the main processing circuit and a program using a device for determining the quantities of consumable products contained in the different reservoirs, which will be described below. The random access memory 109, also associated with the circuit 110 for controlling the ejection of the different printing products, temporarily stores the data received by means of the interface 106 and the data produced by the main processing circuit 100. The latter is connected to a display 104, on which it controls the display of messages representing the operation of the printer and notably, as will be seen below, information on the quantities of printing products remaining in the different reservoirs.

The main processing circuit 100 is connected to a keyboard 105 by means of which the user can transmit operating commands to the printer. The processing circuit controls, by means of an amplification circuit 101, the motor 102 which drives the carriage 62. This motor is here advantageously of the stepping type.

The printing device 10 is equipped with a device for determining the quantities of pigmented products respectively contained in the reservoirs. This device comprises a capacitive arrangement 108 including at least one conductive plate 121, here metallic, associated with each reservoir. In fact each plate 121*a*, 121*b*, 121*c*, 121*d*, 121*e* is pressed against a face of the corresponding reservoir 112*a*–112*e* when the latter is correctly mounted on the support 70 of the carriage 60. The plate forms, with the reservoir and corresponding print head, a capacitor which is connected from the electrical point of view to the earth of the chassis via the resistance (Ra-Re) of the print head. It should be noted that the value of the capacitance of such a capacitor represents the quantity of printing product contained in the corresponding reservoir. The device for determining the different quantities of consumable products contained in these reservoirs also has means of producing an excitation signal 118, 119, here with variable frequency, able to be connected to the said capacitive arrangement 108, and detection and measurement means 115 for detecting and processing a resulting signal, transmitted by the capacitive arrangement and representing a quantity of product contained in one of the reservoirs. The detection and measurement means 115 consist, connected in cascades, of an amplifier 50 which receives the signal coming from the capacitive arrangement of a peak detector 51 and an analogue to digital converter 52, the digital output of which is connected to the processing circuit 100. The peak detector is reset to zero (connection 53) by the processing circuit 100 before each measurement. The signal delivered by the peak detector 51 is supplied to the converter, which transforms it into a digital signal Sni which can be used by the processing circuit 100.

The excitation signal production means comprise here a variable-frequency oscillator 118 able to cover a certain range of frequencies under the control of the processing circuit 100. The output of this oscillator is connected to the input of an amplifier 119. As will be seen below, the latter is capable of being connected to the capacitive arrangement 108 by means of a resistor 119*b*. An inductor 120 is connected between the resistor 119*b* (on the capacitive arrangement side) and earth, in order to constitute, with these elements, a resonant circuit, via electrical connection means 129, which will be described below. In addition, the amplification circuit 114 is connected to the print heads by a flexible cable 62, for the commands for ejecting the printing products.

It should be noted that some of the components making up the device for determining the quantities of consumable products are mounted on the chassis 64, namely more particularly the oscillator 118, the amplifier 119, the resistor 119*b*, the inductor 120 and the detection and measurement means 115, whilst others, comprising notably the reservoirs 112, the print heads 113 and the plates 121, are mounted on the carriage.

The electrical connection means 129 are arranged between the chassis 64 and the carriage 60 in order to electrically put in service each plate 121*a*–121*e* corresponding to a reservoir, for a predetermined position of the carriage. More precisely, since the printing device has several reservoirs grouped together side by side, and the capacitive arrangement therefore has several conductive plates 121*a*–121*e* respectively associated with these reservoirs, the connection means 129 form an electrical selector for electrically selecting and bringing into service the aforementioned plates 121*a*–121*e* corresponding respectively to the reservoirs 112*a*–112*e* for predetermined positions of the carriage.

In the example, all these predetermined positions are in fact situated below the housing 63. It will therefore be understood that a sequence of measurements can be implemented provided that the carriage is engaged underneath this housing. The different capacitors, respectively associated with the different reservoirs, will thus be successively brought into service during the passage of the carriage underneath the housing. The selector comprises on the one hand a common contact element 131 connected to the excitation signal production means and more particularly, according to the example, to the node between the resistor 119*b* and the inductor 120 and to the input of the detection and measurement means 115, and on the other hand a plurality of contact elements 132*a*, 132*b*, 132*c*, 132*d*, 132*e* respectively connected to the conductive plates 121*a*–121*e* associated with the reservoirs. The common contact element 131 is carried by a fixed wall 136 of the chassis. The contact elements 132*a*–132*e* associated with the plates are carried by the carriage 60. Each contact element of the carriage passes close to the common contact element for an aforementioned predetermined position of the carriage.

As can be seen in FIGS. 6 and 9, the common contact element 131 consists essentially of a flexible and elastic metallic blade, preferably curved as depicted. It is riveted to the wall 136 of the chassis and electrically insulated therefrom if the said wall is conductive. In addition, each contact element carried by the carriage also has an elastically flexible blade, preferably metallic, describing a loop 130.

As can be seen in FIGS. 5 to 8, one end 200 of such a loop enters, in the unstressed state of the blade, the recess allocated to the corresponding reservoir. In this position, the loop 130 (or any other part of the contact element) is out of contact with the common contact element 131 for any position of the carriage and notably for any position thereof inside the casing 63. On the other hand, when the said reservoir is placed in its recess on the support 70, it continuously pushes this end 200, and the loop, then stressed, is deformed and pushed in the direction of the wall 136, so that part of the said loop can come into contact with the said common contact element 131 for an aforementioned predetermined position of the carriage.

By means of this simple arrangement, the system can easily recognise whether all the reservoirs have been mounted on the carriage 60 since, if such is not the case, contact will not be established between the corresponding capacitor on the one hand and the excitation and measurement means on the other hand, during a sequence of measuring the quantities of product remaining in the reservoirs. The contact elements are here structurally different according to the reservoirs. Thus, for each of the three reservoirs 112a, 112b, 112c, the loop is arranged substantially perpendicularly to that of the common contact element. In this case, this loop advantageously has a curved engagement element 137 extending roughly perpendicularly to the said loop and it is more particularly this curved engagement element 137 which will come into contact with the common contact element 131 for the corresponding predetermined position of the carriage and if the corresponding reservoir is indeed in place. For these three reservoirs, the plate 121a–121c is directly fixed to an elastically flexible arm of the corresponding contact element 132a–132c. This can be seen in FIG. 7. This elastic mounting of the plate affords good contact between the wall of the reservoir 112a–112c which is intended to be pressed against the said plate.

For the reservoirs 112d and 112e, the plates 121d, 121e are fixed to parallel walls of the carriage, perpendicular to the support 70. The corresponding contact element, forming the loop 130, is fixed and connected to this plate.

Figure 12:
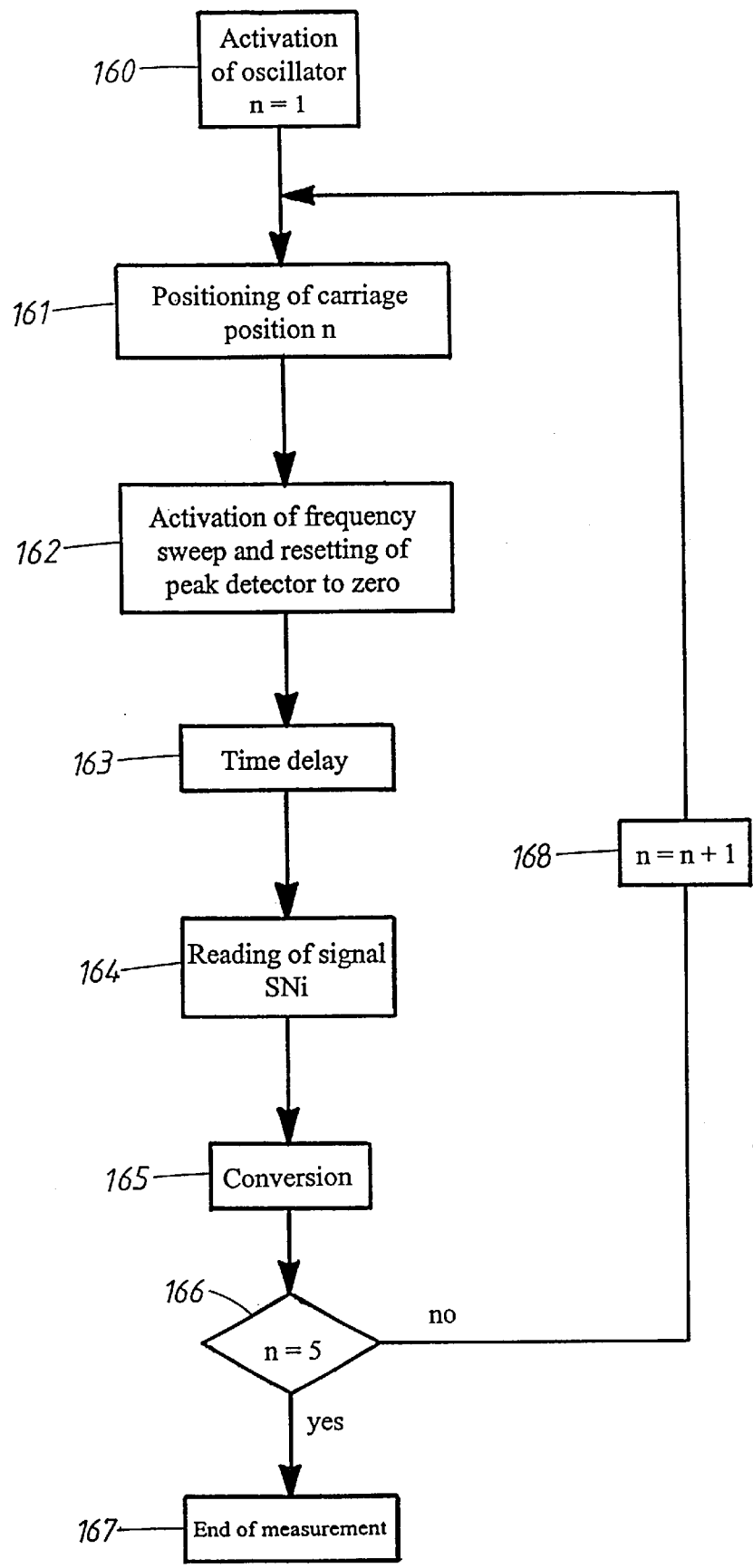
FIG. 12 is a flow diagram of a program resident in read only memory of the device illustrated in FIG. 3 and implementing the invention.

The implementation of the invention is illustrated by the flow diagram in FIG. 12. It is entered in the read only memory 103. The algorithm essentially comprises nine steps 160 to 168, which are run through periodically, for example before or at the end of the printing of a document. At this moment, the algorithm determines the quantity of printing product remaining in each reservoir 112a–112e. The step 160 consists of bringing the oscillator 118 into service, which can on each occasion sweep a frequency range around 4 MHz. This step 160 initialises a variable n=1.

The step 161 consists, for the central unit 100, of moving the carriage in order to bring into service the plate corresponding to the reservoir n, establishing electrical contact between this plate and the common contact element 131.

This is achieved by counting the number of steps of the motor 102. For example, for n=1 the colourless product reservoir will be tested, for n=2 the black product reservoir will be tested, for n=3 the cyan product reservoir will be tested, for n=4 the magenta product reservoir will be tested and for n =5 the yellow product reservoir will be tested.

At the step 162, the central unit sets the peak detector 51 to zero and demands a variation in frequency of the oscillator.

At the step 163, the central units waits for a few hundreds of milliseconds to enable the resonant frequency of the circuit including the capacitor associated with the tested reservoir to be determined.

At the step 164, the processing circuit 100 controls the reading of the digital signal Sni representing the maximum value of the voltage, determined by the peak detector.

At the step 165, the circuit 100 converts this measurement in order to produce an item of information representing the quantity of product contained in the reservoir.

At the step 166, the circuit 100 checks whether all the reservoirs have been tested (that is to say whether n=5). In the negative, step 168 is passed to, consisting of incrementing the number n before returning to the step 161. In the affirmative, step 167 is passed to, which marks the end of the measurement cycle and the display of the results.

Figure 13:
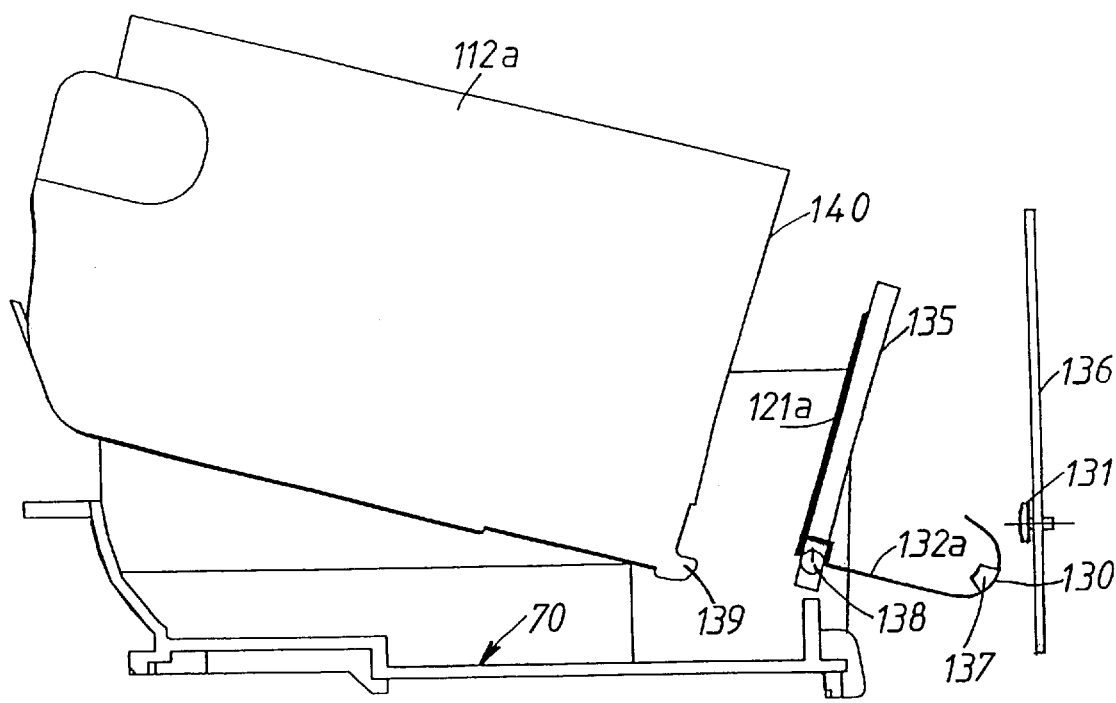
FIG. 13 is a detail view illustrating the fitting of a reservoir on a support fixed to the carriage and incorporating one improvement of the invention.
Figure 14:
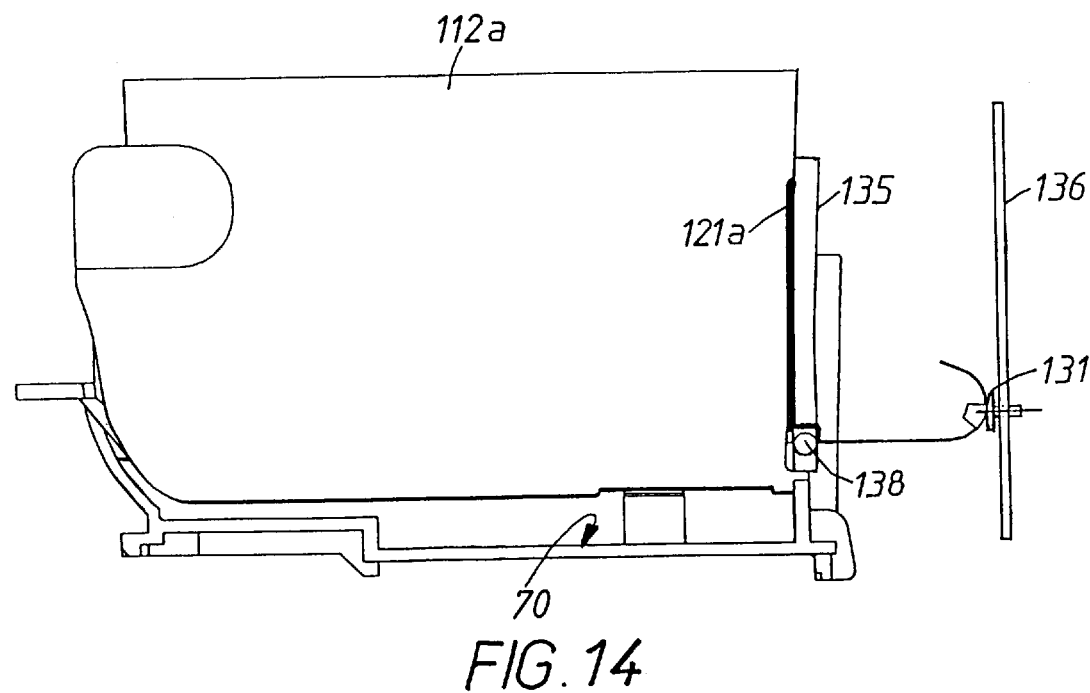
FIG. 14 is a view similar to FIG. 13 illustrating the reservoir in place.

As can be seen in FIGS. 13 and 14 which show another embodiment, the support 70 on the carriage on which the reservoirs are mounted has at least one movable block 135 carrying a conductive plate. As it happens that the reservoir depicted in FIGS. 13 and 14 is the reservoir 112a, the movable block 135 depicted carries the plate 121a. It is clear however that the device can have a comparable arrangement for each reservoir or only some of them or for each cartridge. It can be seen that this block 135, in the absence of a force (FIG. 13), occupies a leaving-clear position, that is to say here inclined towards the wall 136, which facilitates the insertion of the reservoir. It is however arranged so as to be moved by the fitting of the reservoir and to be maintained in another position (FIG. 14) when the reservoir is mounted on the support 70. In this other position, the plate is applied against a face 140 of the reservoir. More precisely, the movable block 135 is mounted so as to be hinged with respect to the carriage, about a spindle 138 situated at the lower part thereof, and tends to tilt freely towards the position illustrated in FIG. 13. The reservoir has an engagement snub 139, at the base of its front face 140, able to cause the movable block 135 to pivot when the reservoir is placed on its support. The snub comes into contact with the lower part of the block, below its articulation spindle 138.

Moreover, each movable block 135 carries one of the contact elements 132a–132e and this is electrically connected to the corresponding plate 121a–121e. FIGS. 13 and 14 only depict the contact element 132a. The arrangement is the same for other contact elements. Because of the tilting of the block, the contact element is therefore able to occupy two positions, a service position (FIG. 14) when the reservoir 112a is in contact with the movable block and an idle position (FIG. 13) when the reservoir 112a is not mounted on its support. This contact element is able, when it is in the service position, to cooperate with another contact element, namely the aforementioned common contact element 131, for at least one predetermined position of the said carriage, in order to establish an electrical connection between the aforementioned two parts of the components of the device for determining the quantity of consumable product contained in the reservoir. When the support is arranged to carry several reservoirs, at predetermined locations, a movable block carrying such a plate can be provided, at each location, in order to be able to cooperate with the corresponding reservoir. The contact elements, respectively associated with the reservoirs, are similar and offset along the inner side of the carriage 60 which is parallel to its direction of movement. The assembly therefore defines an electrical selector for electrically selecting and bringing into service the different plates 121a–121e for different predetermined positions of the carriage when the latter is engaged underneath the housing 63. Such a contact element associated with a plate has an elastically flexible blade, for example metallic, attached to the movable block and projecting substantially perpendicularly to the lower part thereof. When the reservoir is placed on the support 70 and the movable block is in contact therewith, part of this blade is placed so that it can come into contact with the common contact element 131 whilst, when the corresponding reservoir is not placed on the support 70, the blade is tilted downwards and is out of contact with the contact element 131 for any position of the carriage. In the example, the blade of the contact element 132a has a loop 130 designed to come into contact with the common contact element 131. This loop is provided with a curved engagement element 137 extending roughly perpendicularly to the loop. Thus the curved engagement element is situated substantially parallel to the common contact element 131, which facilitates the making of electrical contact between them. The tilting of the loop 130 which accompanies that of the block makes it possible easily to recognise that one of the reservoirs has not been mounted on the carriage 60 since, if such is the case, no contact will be established between the corresponding capacitor on the one hand and the excitation and measurement means on the other hand, during a sequence of measuring the quantities of product remaining in the reservoirs.

It should be noted that, during a phase of printing a line on the document, the carriage is situated outside the housing 70 and consequently the capacitive arrangement is entirely disconnected. It can therefore under no circumstances interfere with the correct functioning of the print heads. In addition, this type of mechanical selector is preferable to an analogue switch for successively connecting the different plates; the stray capacitances inherent in analogue switches are thus avoided.

Naturally, the invention concerns not only the measurement device which has just been described and all printing devices including it, but also all office machines or microcomputers having such a measurement device.

What is claimed is:

1. A device using a consumable product comprising:
   a fixed chassis;
   a carriage mounted for movement relative to said chassis;
   at least one reservoir that contains the consumable product and is carried by said carriage;
   a capacitive arrangement including a conductive plate associated with said reservoir;
   an excitation signal generator connectable to said capacitive arrangement; and
   a detection and measurement circuit for detecting and processing a signal transmitted by said capacitive arrangement and representing a quantity of product contained in said reservoir;
   wherein at least some of said capacitive arrangement, said excitation signal generator, and said detection and measurement circuit, are mounted on said chassis and others are fixed to said carriage;
   and further comprising an electrical connection arranged between said chassis and said carriage at a predetermined position of said carriage, so as to electrically bring into service said plate corresponding to said reservoir when said carriage is at the predetermined position and so as to electrically disconnect said plate when said carriage is away from the predetermined position.

2. A device according to claim 1, comprising plural reservoirs grouped side by side, wherein said capacitive arrangement includes a corresponding plurality of conductive plates associated respectively with said reservoirs, and wherein said electrical connection forms an electrical selector for electrically selecting and bringing into service the plurality of plates corresponding respectively to said reservoirs, for plural predetermined positions of said carriage.

3. A device according to claim 2, wherein said electrical connection comprises a common contact element connected to said excitation signal generator and a plurality of contact elements respectively connected to conductive plates associated with said reservoirs.

4. A device according to claim 3, wherein said common contact element is carried by a fixed wall of said chassis, and said plurality of contact elements is arranged on said carriage at a position where said reservoirs and their conductive plates are situated, each contact element in said plurality passing in a vicinity of said common contact element, for a corresponding one of the predetermined positions of said carriage.

5. A device according to claim 3, wherein said common contact element consists essentially of a flexible elastic blade.

6. A device according to claim 5, wherein the flexible elastic blade is curved.

7. A device according to claim 3, wherein each contact element has an elastically flexible blade describing a loop, wherein one end of each such loop enters, in an unstressed state of said blade, a recess allocated to the corresponding reservoir and is out of contact with said common contact element in any position of said carriage, and wherein when said reservoir is placed in its recess, thereby pushing said one end, said loop is stressed and deformed, so that part of it comes into contact with said common contact element, for a corresponding on of the predetermined positions of said carriage.

8. A device according to claim 7, wherein said part of said loop coming into contact with said common contact element has a curved engagement element, extending roughly perpendicularly to said loop.

9. A device according to claim 7, wherein a corresponding plate is fixed to an elastically flexible arm of the corresponding contact element.

10. A device according claim 7, wherein a corresponding plate is fixed to a wall of said carriage and a corresponding contact element is fixed to this plate.

11. A device according to one of claims 1 to 10, wherein said capacitive arrangement forms part of a resonant circuit, via said electrical connection.

12. A document printing device comprising:
    a chassis;
    a carriage compelled to move along a guidance mechanism arranged on said chassis; and
    a feed mechanism for moving a printing medium arranged on said chassis;
    at least one printing product reservoir and a print head connected to said reservoir, said reservoir and said print head being carried by said carriage, said reservoir being removable and mounted on a corresponding support on said carriage;
    a capacitive arrangement including at least one conductive plate associated with said reservoir;
    an excitation signal generator connectable to said capacitive arrangement; and
    a detection and measurement unit for detecting and processing a signal transmitted by said capacitive arrangement and representing a quantity of printing product contained in said reservoir;
    wherein at least some of said capacitive arrangement, said excitation signal generator, and said detection and measurement unit are mounted on said chassis and others are mounted on said carriage;
    and further comprising an electrical connection arranged between said chassis and said carriage at a predetermined position of said carriage, so as to electrically put into service said plate corresponding to said reservoir when said carriage is at the predetermined position and so as to electrically disconnect said plate when said carriage is away from the predetermined position.

13. A printing device according to claim 12, comprising plural reservoirs grouped together side by side on the support on said carriage, and wherein said capacitive arrangement includes a corresponding plurality of conductive plates associated respectively with said reservoirs, and wherein said electrical connection forms an electrical selector for electrically selecting and putting into service the plurality of plates corresponding respectively to said reservoirs, for plural predetermined positions of said carriage.

14. A device according to claim 12 or 13, wherein said capacitive arrangement forms part of a resonant circuit, via said electrical connection.

15. An office machine having a printing device according to claim 12 or 13.

16. A printing device according to claim 12 or 13, further comprising a microcomputer.

17. A device using a consumable product comprising:
 a fixed chassis;
 a carriage mounted for movement relative to said chassis and having a support;
 at least one reservoir that contains the consumable product and is removably carried on said support of said carriage;
 a capacitive arrangement including at least one conductive plate associated with said reservoir;
 an excitation signal generator connectable to said capacitive arrangement; and
 a detection and measurement circuit for detecting and processing a signal transmitted by said capacitive arrangement and representing a quantity of product contained in said reservoir;
 wherein at least some of said capacitive arrangement, said excitation signal generator, and said detection and measurement circuit, are mounted on said chassis and others are mounted on said movable carriage; and
 wherein said support has a movable block carrying said plate, said block being movable between a leave-clear position in response to presence or absence of said removable reservoir, the leave clear position facilitating insertion and removal of said removable reservoir, and the engagement position applying said plate against a face of said reservoir when said block is in the engagement position.

18. A device according to claim 17, wherein said movable block carries an elastic contact element, electrically connected to said plate and movable between a service position and an idle position, wherein in the service position said reservoir is in contact with said movable block and in the idle position said reservoir is not mounted on its support, and
 wherein said device further comprises an electrical connection arranged between said chassis and said carriage at a predetermined position of said carriage so as to electrically connect to said contact element when said contact element is in said service position and when said carriage is in the predetermined position.

19. A device according to claim 18, wherein said support for said reservoir is installed on said carriage.

20. A device according to claim 18, wherein said support is arranged to carry plural reservoirs at plural predetermined locations and wherein plural movable blocks carrying corresponding plates are arranged at at least some of these locations to cooperate with a corresponding reservoir.

21. A device according to claim 20, wherein plural contact elements associated respectively with said plural reservoirs are similar and offset along one side of said carriage parallel to its direction of movement, and wherein said electrical connection is mounted at a fixed location on said chassis to cooperate with each of said plural contact elements for respective predetermined positions of said carriage, said plural contact elements defining selection means forming an electrical selector, arranged between said chassis and said carriage to electrically select and put into service respective plates corresponding to respective reservoirs, for the predetermined positions of said carriage.

22. A device according to claim 18, wherein the contact element has an elastically flexible blade attached to said movable block , wherein when a reservoir is placed on said support and the corresponding movable block is in contact therewith, part of said blade is positioned to come into contact with said electrical connection for a corresponding predetermined position of said carriage, and wherein said blade is out of contact with said electrical connection for any position of said carriage when the corresponding reservoir is not on said support.

23. A device according to claim 22, wherein said movable block is mounted so as to be hinged and biased to tilt freely towards a position placing the contact element in the idle position.

24. A device according to claim 23, wherein said reservoir has an engagement stub which causes said movable block to pivot, when said reservoir is on said support, so that said plate is pressed against the face of the reservoir and said contact element is in the service position.

25. A device according to claim 22, wherein said blade has a loop in contact with said electrical connection.

26. A device according to claim 25, wherein said loop has a curved engagement element extending roughly perpendicularly to said loop.

27. A device according to claim 22, wherein the flexible blade is metallic.

28. A device according to claim 18, wherein said electrical connection consists essentially of an elastic metallic blade.

29. A device according to claim 20, wherein the metallic blade is curved.

30. A device according to claim 17, wherein said capacitive arrangement forms part of a resonant circuit.

31. A document printing device comprising:
 a chassis;
 a feed mechanism for moving a printing medium arranged on said chassis;
 a carriage compelled to move along a guidance mechanism arranged on said chassis; at least one print head and a support for at least one removable printing product reservoir, said print head and said support being carried by said carriage;
 a capacitive arrangement including at least one conductive plate associated with said reservoir;
 an excitation signal generator connectable to said capacitive arrangement; and
 a detection and measurement circuit for detecting and processing a signal transmitted by said capacitive arrangement and representing a quantity of printing product contained in said reservoir;
 wherein at least some of said capacitive arrangement, said excitation signal generator, and said detection and measurement circuit, are mounted on said chassis and others are mounted on said carriage; and
 wherein said support has a movable block carrying said plate, said block being movable between a leave-clear position and an engagement position in response to presence or absence of said removable reservoir, the leave-clear position facilitating insertion and removal of said removable reservoir, and the engagement position applying said plate against a face of said reservoir when said block is in the engagement position.

32. A printing device according to claim 31, wherein said movable block carries an elastic contact element, electrically connected to said plate and movable between a service position and an idle position, wherein in the service position said reservoir is in contact with said movable block and in the idle position said reservoir is not mounted on its support, and wherein said device further comprises an electrical connection arranged between said chassis and said carriage at a predetermined position of said carriage so as to electrically connect to said contact element when said contact element is in said service position and when said carriage is in the predetermined position.

33. A document printing device according to claim 31, wherein said support is arranged to carry plural reservoirs at plural predetermined locations and wherein plural movable blocks carrying corresponding plates are arranged at at least some of these locations to cooperate with a corresponding reservoir.

34. A printing device according to claim 33, wherein plural contact elements associated respectively with said plural reservoirs are similar and offset along one side of said carriage parallel to its direction of movement, and wherein said electrical connection is mounted at a fixed location on said chassis to cooperate with each of said plural contact elements for respective predetermined positions of said carriage, said plural contact elements defining selection means forming an electrical selector, arranged between said chassis and said carriage to electrically select and put into service respective plates corresponding to respective reservoirs, for the predetermined positions of said carriage.

35. A printing device according to claim 34, wherein the contact element has an elastically flexible blade attached to said movable block, wherein when a reservoir is placed on said support and the corresponding movable block is in contact therewith, part of said blade is positioned to come into contact with said electrical connection for a corresponding predetermined position of said carriage, and wherein said blade is out of contact with said electrical connection for any position of said carriage when the corresponding reservoir is not on said support.

36. A printing device according to claim 35, wherein said movable block is mounted so as to be hinged and biased to tilt freely towards a position placing the contact element in the idle position.

37. A printing device according to claim 35, wherein the flexible blade is metallic.

38. An office machine having a printing device according to claim 31.

39. A printing device according to claim 31, further comprising a microcomputer.

* * * * *

UNITED STATES PATENT AND TRADEMARK OFFICE
CERTIFICATE OF CORRECTION

PATENT NO. : 6,352,325 B1
DATED : March 5, 2002
INVENTOR(S) : Christophe Truffaut et al.

It is certified that error appears in the above-identified patent and that said Letters Patent is hereby corrected as shown below:

Column 9,
Line 55, "units" should read -- unit --.

Column 12,
Line 22, "on" should read -- one --.

Column 13,
Line 11, "device" should read -- printing device --; and
Line 41, "leave clear" should read -- leave-clear --.

Column 14,
Line 12, "block ," should read -- block, --;
Line 38, "claim 20," should read -- claim 28, --; and
Line 47, "at" should read -- with at --.

Signed and Sealed this

Twenty-ninth Day of October, 2002

*Attest:*

*Attesting Officer*

JAMES E. ROGAN
*Director of the United States Patent and Trademark Office*